United States Patent
Camus et al.

(10) Patent No.: US 6,594,399 B1
(45) Date of Patent: Jul. 15, 2003

(54) METHOD AND APPARATUS FOR INTEGRATING MULTIPLE 1-D FILTERS INTO A DIGITAL IMAGE STREAM INTERFACE

(75) Inventors: Theodore A. Camus, Mount Laurel, NJ (US); Kevin Carl Kaighn, Mount Laurel, NJ (US); Gary Alan Greene, Cherry Hill, NJ (US)

(73) Assignee: Sensar, Inc., Moorsetown, NJ (US)

( * ) Notice: Subject to any disclaimer, the term of this patent is extended or adjusted under 35 U.S.C. 154(b) by 0 days.

(21) Appl. No.: 09/078,767

(22) Filed: May 14, 1998

(51) Int. Cl.$^7$ .............. G06T 3/40; G06T 5/50
(52) U.S. Cl. ........... 382/260; 382/265; 382/298; 708/308
(58) Field of Search ............ 348/222; 382/260, 382/261, 299, 277, 282, 265, 284, 208, 205, 298; 358/447; 708/308, 300, 316

(56) References Cited

U.S. PATENT DOCUMENTS

| | | | | |
|---|---|---|---|---|
| 3,936,800 A | * | 2/1976 | Ejiri et al. ............ | 382/205 |
| 4,797,942 A | * | 1/1989 | Burt ..................... | 382/284 |
| 5,067,015 A | * | 11/1991 | Combridge et al. ..... | 348/398 |
| 5,347,590 A | * | 9/1994 | Nonnweiler et al. ..... | 382/132 |
| 5,359,674 A | | 10/1994 | van der Wal | |
| 5,568,192 A | * | 10/1996 | Hannah ................. | 348/222 |
| 5,790,205 A | * | 8/1998 | Pettitt et al. ........... | 348/629 |
| 5,835,630 A | * | 11/1998 | Schweid et al. ........ | 382/173 |
| 5,867,214 A | * | 2/1999 | Anderson et al. ....... | 348/231 |
| 5,920,652 A | * | 7/1999 | Wilkinson .............. | 382/260 |

\* cited by examiner

Primary Examiner—Scott Rogers
(74) Attorney, Agent, or Firm—Woodcock Washburn LLP

(57) ABSTRACT

In a method of integrating one or more 1-dimensional filters into a digital image stream interface a single digital video input is processed by multiple 1-dimensional digital image filters, especially recursive filters, and combined into a single digital image stream which can be transmitted via a high-speed interface to a host computer's memory such that each 1-dimensional filter output can be automatically extracted and placed into its own separate memory buffer for subsequent processing by a secondary image processing device. This additional processing can include the second pass of a two-pass separable filter implemented in software on a general-purpose CPU, and in particular can result in the generation of an image pyramid. This combined hardware and software approach can produce low-cost 2-D digital image filter implementations small enough to be added to existing standard ASIC's while still retaining high performance.

21 Claims, 3 Drawing Sheets

METHOD AND APPARATUS FOR INTEGRATING MULTIPLE 1-D FILTERS INTO A DIGITAL IMAGE STREAM INTERFACE

FIELD OF THE INVENTION

The invention relates to hardware implementations of one-dimensional filters applied to digital images such as are supplied from digital cameras, especially applying multiple such filters including recursive filters to a stream of digital images. More specifically, the resulting filtered digital image may then be processed in software on a general-purpose computer to complete a two-dimensional digital image filter.

BACKGROUND OF THE INVENTION

Digital image processing filters are common in the electronics and computer industries. Applications include medical imaging, video conferencing, computer graphics, and satellite surveillance; in all these areas it is necessary to process digital images quickly and cheaply. Image processing ASIC's are often highly suitable for such applications. Another useful function is image compression, which reduces the data content of a given image at a cost of a possible loss of resolution or an introduction of artifacts. This data reduction is a critical step in sending images over a data channel of limited bandwidth.

One type of image processing is the generation of an image pyramid, which represents an image at multiple scales. This form of image representation is useful for isolating features of a specific scale and to implement coarse-to-fine algorithms. In addition, it may be possible to reduce image data bandwidth by transmitting a coarser level of an image pyramid if the original, full-resolution image is not required. Specialized hardware for generating full pyramids are described in U.S. Pat. No. 5,359,674 to van der Wal. That system generates pyramids in hardware using a separable filter, consisting of two separate passes of a 1-D filter. These pyramid chips require large line delay memories integrated into the ASIC itself to provide the necessary intermediate storage for the final 2-D filter results. Consequently, the filtering cannot be done using standard single chip ASIC's, but instead require specialized hardware. Therefore, the hardware costs for such a system are relatively expensive.

There is a need for a digital image filtering system that can perform 2-D filtering by simply modifying a typical existing single chip ASIC core, such as a digital camera controller ASIC. Such a system should be able to produce the same results as the pyramid processor without requiring either large ASIC's with substantial on-chip memories or multiple chip implementations. This system would be substantially less expensive than the pyramid processor.

SUMMARY OF THE INVENTION

We provide a reliable method and apparatus for integrating one or more one-dimensional digital image filters into a single image stream. In our method we only perform one step of the two-pass full pyramid generation process in hardware by producing one-dimensional partial-pyramided results. Then we perform the second pass in software. The input to the first pass consists of the full-resolution original images, or only the odd or even raster lines of a video image, and are performed in hardware for maximum speed. The input to the second pass consists of partially-pyramided images, which are smaller than the original full-resolution images, and therefore can be efficiently transmitted via a (typically high-bandwidth) digital transmission interface to a host computer's memory and processed in software at video rates by an inexpensive general-purpose CPU. These smaller, partially-pyramided images which are input to the second pass require correspondingly fewer computational cycles than the larger images input to the first pass, making a software implementation of the second pass feasible.

As a result of this combination of hardware and software approaches we do not require large line-delay memories as an intermediate storage for the final full 2-D filter results which would be necessary for a hardware-only approach such as is disclosed in the van der Wal patent. This results in a substantial savings in hardware (VLSI chip real-estate) and thus cost. The hardware requirements are designed to be sufficiently low, that this one-dimensional filtering can be added onto existing digital interface ASIC's without requiring multiple-chip implementations. Even though much less hardware is used than in devices performing two-dimensional filtering, the majority of the computational cycles required for this process can be performed one-dimensionally; resulting in a much higher performance-cost ratio. In addition, our device is able to interleave multiple one-dimensional filter results, including recursive one-dimensional filter results, into a single output stream (whose components can be separated by an appropriate decoder) without requiring on-chip memory to store the intermediate filter results. Thus, the only on-chip video memory required, other than that required for the one-dimensional digital image filtering itself, is any buffering necessitated by the high-bandwidth transmission interface to compensate for latency inherent to the transmission medium.

The image output can be connected to a high-bandwidth transmission interface such that each image filter result can be automatically extracted from the image stream. The extracted images can be placed into a separate buffer in a host computer's image memory in a form suitable for subsequent additional filtering, especially the second pass of a two-pass separable digital image filter. This combination of hardware and software filtering represents a significant cost and size savings over a hardware-only implementation while still providing high performance.

Other objects and advantages of the invention will become apparent from a description of certain present preferred embodiments thereof shown in the drawings.

DESCRIPTION OF THE PREFERRED EMBODIMENTS

Figure 1:
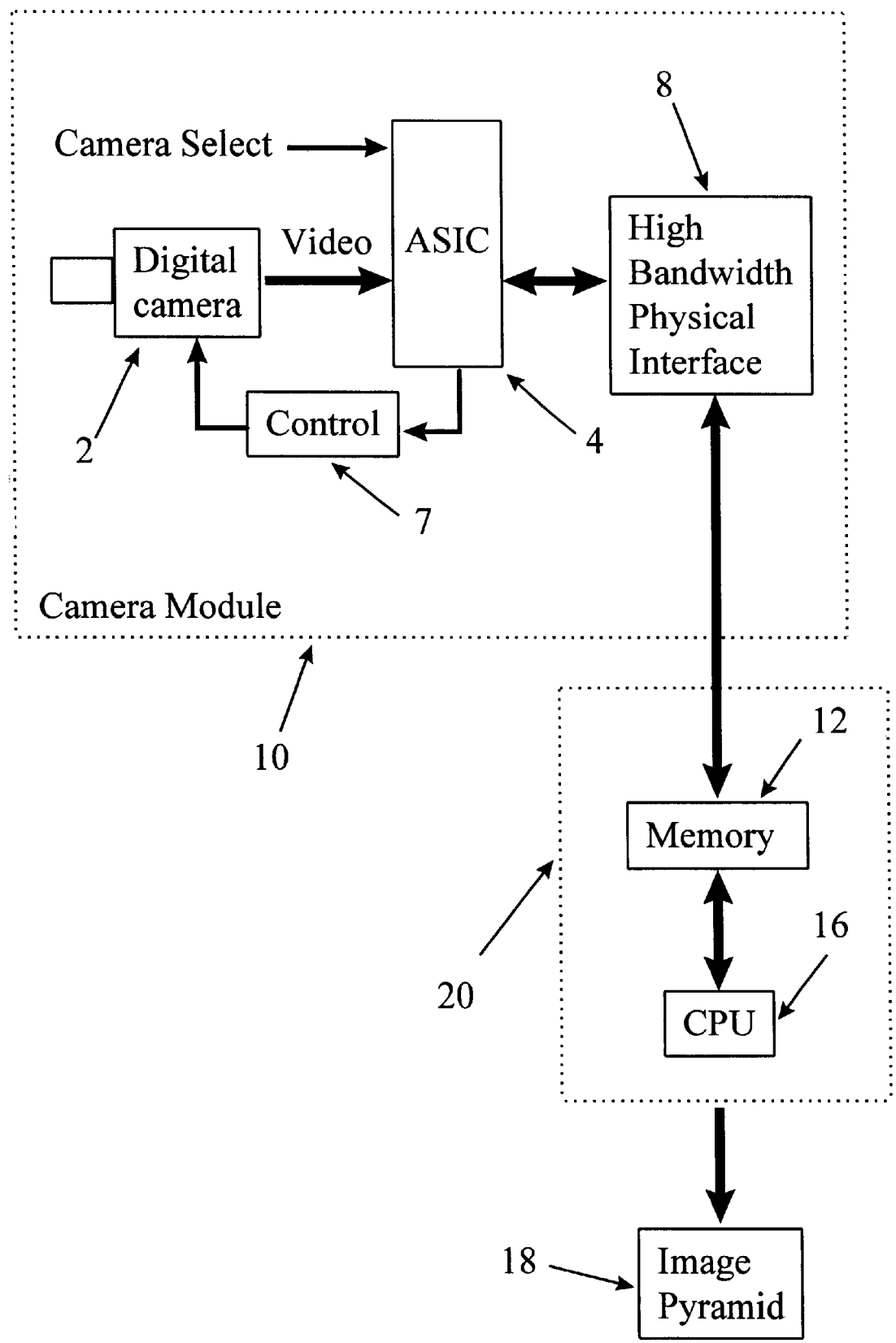
FIG. 1 is a diagram showing a preferred embodiment of the present invention which utilizes a portion of an ASIC to do one-dimensional filtering as part of a digital camera assembly connected to a high-speed digital interface.

A first preferred embodiment of the present invention shown in FIG. 1 utilizes a digital camera 2 to provide a full resolution image to the ASIC 4 for processing. The ASIC performs one dimensional filtering to create a filtered image output. The ASIC also contains a control program which directs the camera through a camera control interface 7. The resulting horizontally pyramided video from the ASIC is sent through a high bandwidth physical interface 8 to the memory 12 of a inexpensive general purpose CPU 16 which can process the image further, for example to produce an image pyramid 18. We prefer that the ASIC 4 and interface 8 be connected to the camera 2 to form a single unit 10 that we call a camera module.

Figure 2:
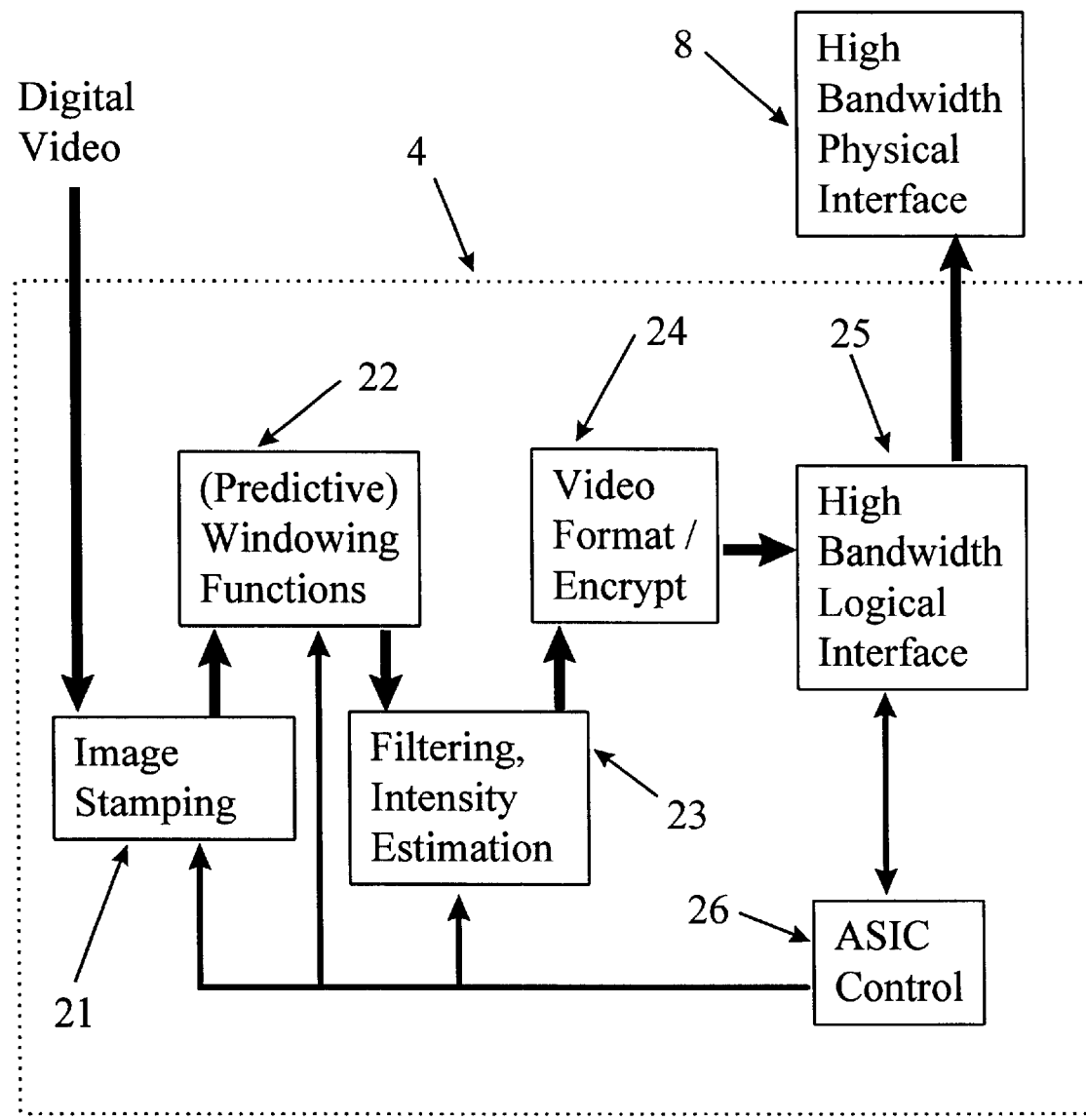
FIG. 2 is a diagram showing the top-level block structure of an implementation of the ASIC shown in FIG. 1.

FIG. 2 shows the image flow through the ASIC 4. The digital image is stamped 21 with significant environmental information such as time of day and then forwarded to the windowing function 22. The windowing function presents the opportunity to reduce the amount of initial information that is processed by extracting a region of interest from the original image as specified by the ASIC control sequencer, 26. After windowing 22, the remaining image is then sent to the filtering function 23 before being written to the video formatting/encryption block 24 and high-bandwidth logical interface 25.

Figure 3:
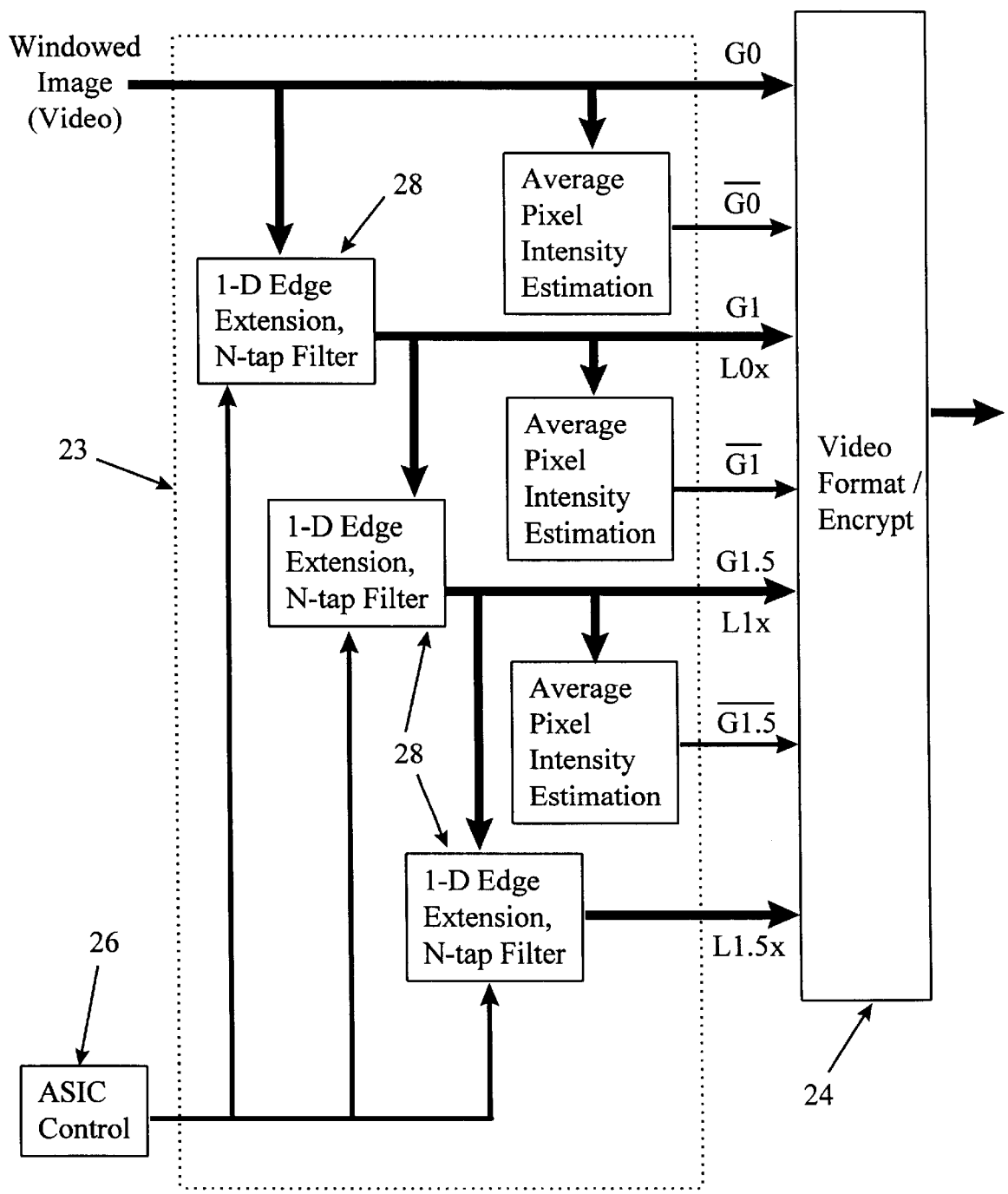
FIG. 3 is a block diagram of the filtering and intensity estimation components of the ASIC.

FIG. 3 shows a top level view of the activities involved in this block 23. The windowed image, denoted as G0 in FIG. 3, enters the filtering block 23 and after processing is written to the video formatting/encryption block 24. As shown in FIG. 3 within the filtering block 23 the image is edge extended, sent through a programmable N tap filter and then subsampled in block 28 to create a 1-dimensional horizontally filtered image that we will denote as a G1 image. The notation "G1" refers to the fact that the image represents level one of the Gaussian pyramid. As such, its size is reduced by a factor of two from the G0 image in both the horizontal dimension (effected by subsampling) and the vertical dimension (effected by simply ignoring every other row). This G1 image, while it is being written to the video formatting/encryption block 24, is in parallel being processed through an identical N tap filter and horizontally subsampled to generate what we denote as a G1.5 image. (This notation refers to the fact that although the G1.5 image has the horizontal resolution of a G2 image, having been subsampled in the horizontal dimension, it still retains the vertical resolution of a G1 image; thus, its resolution is represented as being in between a G1 image and a G2 image.) This image is also written to the transmit video formatting/encryption block 24. Further coarser levels of the image pyramid, from G2 on, can be produced from the transmitted G1.5 image in software on a host computer. The average image intensity of the G0, G1, and G1.5 images are calculated inside filtering block 23 to facilitate the implementation of auto-exposure and automatic gain control (AGC) algorithms. This information is also passed along to the formatting/encryption block 24 (represented in FIG. 3 using the standard overline notation for the mean).

Note that filtering block 23 can also produce 1-dimensional Laplacian images constructed from the subtraction of a one-dimensionally Gaussian-filtered image from the original unfiltered image. For example, the subtraction of a one-dimensionally Gaussian filtered G0 image, which is not subsampled, from the original G0 image results in what we denote as a L0x image. The notation "L0x" refers to the fact that the image is the Laplacian of the level zero image of the Gaussian pyramid, but the Laplacian operator is only performed horizontally along the X-axis of the image. These one-dimension Laplacian images can be produced by the N tap filter blocks 28 because both the original input image and the one-dimensionally filtered images are available for processing. One-dimensional Laplacian images are useful for detecting vertically-aligned edges at various scales in the image.

This hardware configuration can support both interlaced and progressive-scan (non-interlaced) cameras. In the case of an interlaced camera, a single video frame consists of an interlaced pair of fields, an odd field of raster lines and an even field of raster lines, taken a short period of time apart, typically $\frac{1}{60}^{th}$ of a second for RS 170 formatted video. For this case it may be desirable to separate the results of the filter outputs of the odd lines and the even lines, for example in order to prevent the motion blur of fast-moving objects. This can be supported with the described hardware by controlling the destination addresses for the odd field results and the even field results. This separation of the odd field from the even field also has the effect of performing a subsampling in the vertical dimension, which is why there is no G0.5 image output produced. In the case of a progressive-scan camera, all pixels are exposed simultaneously, thus motion blur is minimized and one of the two sets of raster lines may simply be discarded, which also effects a subsampling in the vertical dimension.

As shown in FIG. 2 the video formatting/encryption block 24 will take each of the streaming image pixels, calculate a CPU memory address for each, optionally encrypt and then send them out of the ASIC to the transmit FIFO (first-in first-out) high-bandwidth physical interface 8 to await transmission into CPU memory 12 (shown in FIG. 1). The encryption function of block 24 encrypts the single output image stream to prevent the unauthorized viewing or capture of the camera's digital video, and can be used as a means of authenticating the digital image stream, such as by the generation of a digital signature based on the digital filter output. Each resulting image will be sent to a separate location in memory 12 based on which filter generated the pixel and where in the image the pixel resides. The memory 12 or a separate memory (not shown) contains a program which enables the CPU 16 to further filter the images in memory 12 to produce an image pyramid 18. As indicated by box 20 in dotted line, the memory 12 and CPU 16 can be part of a general purpose computer, such as any desktop PC currently available on the market. The amount of processing power necessary is dependent on the processing performed and the required throughput.

Our approach at generating pyramided images has several advantages worth noting. One advantage of our method is that the pixels are processed as quickly as they arrive and require virtually no additional memory storage. This results in a less expensive system utilizing a single ASIC. Another advantage is that it presents the opportunity to provide the CPU with horizontally pyramided images with virtually no delay seen by the CPU of the original image in its memory. Finally, the approach also affords the opportunity to reduce system bandwidth requirements since our implementation allows the CPU to select which level images it wants to see at any given time (i.e. G0, G1, G1.5).

Our method can be used with any type of video camera although we prefer to use a digital CMOS (complementary metal-oxide semiconductor) image device, because it can be readily integrated with other digital circuits thereby reducing chip count. Although disclosed in the context of pyramid generation, our method can also be used in any number of image processing algorithms where at least some of the computation can be performed one-dimensionally. These can include such filters as a separable median filter (P. Narendra, "A Separable Median Filter for Image Noise Smoothing", IEEE *Transactions on Pattern Analysis and Machine Intelligence*, 3(1):20–29, January 1981), or the separable averaging box-car filter (M. McDonnell, "Box-Filtering Techniques", *Computer Graphics and Image Processing*, 17:65–70, 1981), both of which have applications in digital image noise removal. Note that in such cases it is not absolutely necessary to complete the second pass of the separable digital image filter. For example, performing only the first pass of a separable digital image noise removal filter may produce acceptable results and would have the advantage of higher throughput.

While we have described and shown certain present preferred embodiments of our method, it should be distinctly understood that our invention is not limited thereto but may be variously embodied within the scope of the following claims.

We claim:

1. A method for producing a filtered digital image comprising:
   a. feeding a digital image into an image processing ASIC;
   b. performing one-dimensional filtering of the digital image within the ASIC to create single or multiple digital image filter results, the image filter results being at least one partially-pyramided image that is smaller than the digital image;
   c. transferring the image filter results through a single image output stream;
   d. storing the image output stream in a memory; and
   e. filtering at least some portions of the stored image output stream using software in a computer processing unit to produce a filtered image.

2. The method of claim 1 wherein the digital image filter results is transmitted via a high-bandwidth interface to the memory for storage.

3. The method of claim 1 wherein each filter result from the single image output stream is extracted and placed into a separate memory buffer in a host computer's memory.

4. The method of claim 1 wherein the filtering in step e is performed in software on a general-purpose CPU.

5. The method of claim 1 wherein step e produces at least one level of a multi-resolution image pyramid.

6. The method of claim 1 also comprising extracting a region of interest from the digital image via a windowing function implemented in hardware on the ASIC prior to filtering.

7. The method of claim 6 also comprising feeding the extracted region through at least one programmable tap filter.

8. The method of claim 1 also comprising computing an average intensity for each filter result in parallel with any further filtering of the result.

9. The method of claim 1 also comprising encrypting the digital image filter results.

10. The method of claim 1 also comprising subsampling the filtered image with programmable phase.

11. The method of claim 1 also comprising performing additional filtering on one of the original digital image and a filtered image in a recursive fashion.

12. The method of claim 11 wherein the additional filtering comprises processing that includes combining the original digital image and a filtered image.

13. The method of claim 12 wherein the additional filtering comprises subtraction of a filtered image from the original digital image.

14. The method of claim 1 wherein the digital image is comprised of video raster lines.

15. The method of claim 14 wherein the raster lines are even raster lines from another image comprised of even raster lines and odd raster lines.

16. The method of claim 14 wherein the raster lines are odd raster lines from another image comprised of even raster lines and odd raster lines.

17. An apparatus for producing a filtered image comprising:
   a. a camera which produces a digital image;
   b. an ASIC connected to the camera the ASIC configured to perform one dimensional filtering on images received from the camera to produce filtered images comprised of partially pyramided images that are smaller than the received images;
   c. at least one memory connected to the ASIC capable of receiving the filtered images from the ASIC, the memory also containing software for performing filtering of the filtered images stored in the at least one memory; and
   d. a computer processing unit connected to the at least one memory.

18. The apparatus of claim 17 also comprising a high speed interface connected between the ASIC and the memory.

19. The apparatus of claim 17 wherein the camera and ASIC are connected together in a single camera module and the memory and computer processing unit are a part of a general purpose CPU.

20. The apparatus of claim 17 wherein the ASIC contains at least one programable tap filter.

21. A method for producing a filtered digital image comprising:
   a. feeding a digital image into an image processing ASIC;
   b. performing one-dimensional filtering of the digital image within the ASIC to create image filter results, the image filter results being at least one partially pyramided image smaller than the digital image; and
   c. transferring the image filter results through a single image output stream.

* * * * *